(12) United States Patent (10) Patent No.: US 12,565,102 B2
Jun (45) Date of Patent: Mar. 3, 2026

(54) IMAGE ADJUSTING METHOD FOR A VEHICLE AND A VEHICLE USING SAME

(71) Applicants: HYUNDAI MOTOR COMPANY, Seoul (KR); KIA CORPORATION, Seoul (KR)

(72) Inventor: Sung Hwan Jun, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 183 days.

(21) Appl. No.: 18/518,095

(22) Filed: Nov. 22, 2023

(65) Prior Publication Data

US 2025/0042251 A1 Feb. 6, 2025

(30) Foreign Application Priority Data

Jul. 31, 2023 (KR) ......................... 10-2023-0099557

(51) Int. Cl.
B60K 35/29 (2024.01)
B60K 35/23 (2024.01)
B60K 35/28 (2024.01)

(52) U.S. Cl.
CPC .............. B60K 35/29 (2024.01); B60K 35/23 (2024.01); B60K 35/28 (2024.01); B60K 2360/166 (2024.01); B60K 2360/176 (2024.01); B60K 2360/177 (2024.01); B60K 2360/1876 (2024.01)

(58) Field of Classification Search
CPC ........ B60K 35/29; B60K 35/28; B60K 35/23; B60K 2360/166; B60K 2360/176; B60K 2360/1876; B60K 2360/177
See application file for complete search history.

(56) References Cited

U.S. PATENT DOCUMENTS

2017/0072850 A1* 3/2017 Curtis .................... B60K 35/85

* cited by examiner

*Primary Examiner* — Michael D Lang
(74) *Attorney, Agent, or Firm* — Lempia Summerfield Katz LLC

(57) ABSTRACT

A method for adjusting a video image in a vehicle equipped with a driving video recording device, and a vehicle using same, are disclosed. The method may include obtaining, by a camera module of the driving video recording device, video data corresponding to a video depicting surroundings of the vehicle. The method may also include obtaining, by a processor of the driving video recording device, a gravity vector acquired using a G sensor of the driving video recording device. The method may additionally include determining, by the processor, an adjustment value according to the gravity vector acquired using the G sensor. The adjustment value may include one or both of a pitch adjustment value or a roll adjustment value. The method may further include adjusting, by the processor, the video data using the adjustment value to generate adjusted video data. The method may also include displaying, by a head unit of the vehicle, the adjusted video data together with navigation information on a screen.

18 Claims, 7 Drawing Sheets

IMAGE ADJUSTING METHOD FOR A VEHICLE AND A VEHICLE USING SAME

CROSS-REFERENCE TO RELATED APPLICATION

The present application claims priority to Korean Patent Application No. 10-2023-0099557, filed on Jul. 31, 2023, the entire contents of which are incorporated herein by reference.

TECHNICAL FIELD

The present disclosure relates to a video adjusting method for a vehicle and a vehicle using same.

BACKGROUND

A drive video recording device is a device for recording a video of a driving situation of a vehicle, for example.

To this end, the drive video recording device typically includes a controller, a memory for storing videos, and a camera for recording videos.

In general, the drive video recording device stores vehicle driving data along with a video depicting surroundings of a vehicle while the vehicle is driving. The drive video recording device may also record a video according to a previous input setting when a set event is sensed during parking.

The drive video recording device was initially called a black box and was only installed as an external device. More recently, however, drive video recording devices have been built into vehicles before the vehicles are shipped.

The built-in drive video recording device is more advantageous than the extremal drive video recording device in that it is possible to access driving data of a host vehicle and to connect with other controllers of the host vehicle. Thus, the use of the built-in type of the video recording device is expected to gradually increase.

SUMMARY

As the camera performance of the driving video recording device is improved, the video may be used for augmented reality (AR) view navigation (or AR navigation, for short).

Generally, in an assembly End-Of-Line (EOL), grid cross-point coordinates of a tolerance adjustment plate are recognized through a camera module under a level-ground condition, and calibration is performed in connection with a yaw angle, a pitch angle, a roll angle, and the like of the camera module using the cross-point coordinates.

However, because the camera module is sometimes tilted or shifted after the vehicle is shipped, or because the posture (e.g., the pitch angle and/or the roll angle) of the vehicle body is frequently affected by a loading state (e.g., weight or position) of the vehicle, distortions between the AR image and the video may occur, particularly in a loading state in which asymmetry is severe.

For example, as illustrated in FIG. 1, distortions may occur between a lane line LL obtained from a camera module video and an overlay AR image Cpt for displaying a driving lane of a host vehicle as an AR image.

Embodiments of the present disclosure solve at least one of the above-described problems.

Embodiments of the present disclosure provide a video adjustment method for a video of a camera module of a driving video recording device, and a vehicle using same.

Embodiments of the present disclosure provide a method for recording a video of a driving video recording device in an adjusted video, and a vehicle using same.

According to an embodiment, a method for adjusting a video image in a vehicle equipped with a driving video recording device is provided. The method may include obtaining, by a camera module of the driving video recording device, video data corresponding to a video depicting surroundings of the vehicle. The method may also include obtaining, by a processor of the driving video recording device, a gravity vector acquired using a G sensor of the driving video recording device. The method may additionally include determining, by the processor, an adjustment value according to the gravity vector acquired using the G sensor. The adjustment value may include one or both of a pitch adjustment value or a roll adjustment value. The method may further include adjusting, by the processor, the video data using the adjustment value to generate adjusted video data. The method may also include displaying, by a head unit of the vehicle, the adjusted video data together with navigation information on a screen.

In at least one embodiment of the present disclosure, the adjustment value is determined based on a preset gravity vector and a gravity vector acquired using the G sensor.

In at least one embodiment of the present disclosure, the preset gravity vector is determined based on a gravity vector acquired by the G sensor at a time of an initial tolerance adjustment for the camera module.

In at least one embodiment of the present disclosure, the method further includes determining whether the vehicle satisfies an adjustment condition including one or both of i) a first condition on whether the vehicle is in a stopped state or ii) a second condition on whether one or both of a) data acquired by one or both of a roll sensor of the vehicle or a pitch sensor of the vehicle is within a set error range from preset data or ii) a road which the vehicle is currently on is level.

In at least one embodiment of the present disclosure, the preset data includes one or both of i) initial roll data acquired by the roll sensor at an initial tolerance adjustment for the camera module or ii) initial pitch data acquired by the pitch sensor at the initial tolerance adjustment for the camera module.

In at least one embodiment of the present disclosure, the method further includes determining a matching property between the adjusted video data and an augmented reality (AR) image of the navigation information.

In at least one embodiment of the present disclosure, the method further includes determining an offset value based on the AR image and the adjusted video data according to the matching property.

In at least one embodiment of the present disclosure, adjusting the video data includes applying the offset value.

In at least one embodiment of the present disclosure, determining of offset value includes one or more of i) determining a roll offset value based on an angle between a lane line recognized from the adjusted video data and the AR image of a host lane overlay shaped to cover a driving lane of the vehicle, ii) determining a first pitch offset value based on an intersection point between the lane line and the AR image of the host lane overlay, or iii) determining a second pitch offset value based on a distance between a vanishing point of lane lines recognized from the adjusted video and a vanishing point of the AR image of the host lane overlay.

In at least one embodiment of the present disclosure, the method further includes initializing the adjustment value when a start switch of the vehicle is switched to an ignition off (IG Off) state and then switched to an ignition on (IG On) state or when a load weight or position of the vehicle is changed.

According to at least one embodiment of the present disclosure, a vehicle including a driving video recording device is provided. The driving video recording device includes a G sensor and a camera module configured to acquire video data corresponding to a video of surroundings of the vehicle. The driving video recording device also includes a first memory configured to store the video data, a second memory configured to store a computer program for controlling storage of the video data, and a controller including a processor confirmed to execute the computer program. The vehicle also includes a head unit configured to receive the video data from the camera module and display the video data together with navigation information on a screen. The processor is configured execute the computer program to determine an adjustment value according to a gravity vector acquired by the G sensor. The adjustment value may include one or both of a pitch adjustment value or a roll adjustment value. The processor is configured to further execute the computer program to adjust the video data using the adjustment value.

In the vehicle of at least one embodiment of the present disclosure, the adjustment value is determined based on a preset gravity vector and the gravity vector acquired by the G sensor.

In the vehicle of at least one embodiment of the present disclosure, the preset gravity vector is determined based on a gravity vector acquired by the G sensor at a time of an initial tolerance adjustment for the camera module.

In the vehicle of at least one embodiment of the present disclosure, the processor is further configured to determine whether the vehicle satisfies an adjustment condition including one or both of i) a first condition on whether the vehicle is in a stopped state or ii) a second condition on whether a) data acquired by one or both of a roll sensor of the vehicle or a pitch sensor of the vehicle is within a set error range from preset data or b) a road which the vehicle is currently on is level.

In the vehicle of at least one embodiment of the present disclosure, the preset data includes one or both of i) initial roll data acquired by the roll sensor at an initial tolerance adjustment time for the camera module or ii) initial pitch data acquired by the pitch sensor at the initial tolerance adjustment time for the camera module.

In the vehicle of at least one embodiment of the present disclosure, the processor is further configured to determine a matching property between the adjusted video data and an augmented reality (AR) image of the navigation information.

In the vehicle of at least one embodiment of the present disclosure, the processor is further configured to determine an offset value based on information recognized from the AR image and the adjusted video according to the matching property.

In the vehicle of at least one embodiment of the present disclosure, the processor is configured to adjust the video data by further applying the offset value.

In a vehicle of at least one embodiment of the present disclosure, the processor is configured to determine the offset value at least by performing one or more of i) determining a roll offset value based on an angle between at least one of lane lines recognized from the adjusted video data and the AR image of a host lane overlay shaped to cover a driving lane of the vehicle, ii) determining a first pitch offset value based on an intersection of the at least one of lane lines and the overlay AR image of the host lane overlay, or iii) determining a second pitch offset value based on a distance between a vanishing point of the lane lines and a vanishing point of the AR image of the host lane overlay.

In the vehicle of at least one embodiment of the present disclosure, the processor is further configured to initialize the adjustment value when a starting switch of the vehicle is switched to an ignition off (IG Off) and then switched to an ignition on (IG On) state or when a load weight or position of the vehicle is changed.

According to embodiments of the present disclosure, the quality of the AR navigation and the driving video recording device can be improved by adjusting the distortion of the video incurred by the position of the camera module, which varies depending on the loading state.

DETAILED DESCRIPTION

Figure 1:
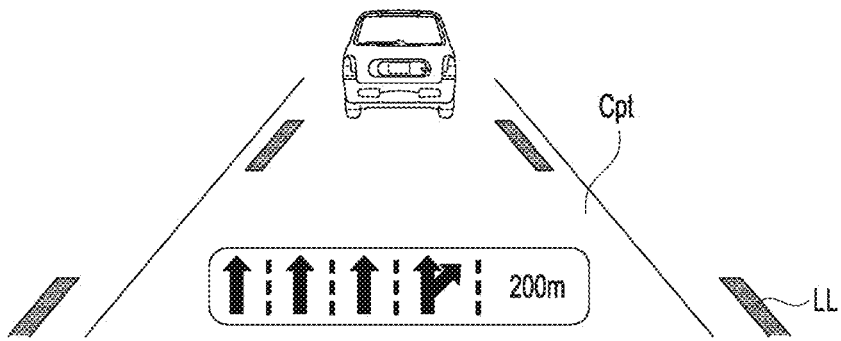
FIG. 1 illustrates a state in which a camera module video and an AR image deviate from each other, according to an embodiment of the present disclosure.

Although specific embodiments are described below and illustrated in the drawings, it should be appreciated by those having ordinary skill in the art that the present disclosure may be modified in various ways. The specific embodiments are not intended to limit the technical spirit of the present disclosure. It should be understood that the present disclosure includes all modifications, equivalents, and replacements included in the spirit and the technical scope of the present disclosure.

Terms such as "module," "unit," or the like used herein are used only for name distinction between elements. These terms should not be construed as being physiochemically divided or separated or assumed that they can be divided or separated.

Terms including ordinals such as "first," "second," or the like may be used to describe various elements. However, the elements are not limited by the terms. The terms are used only for the purpose of distinguishing one element from another element.

The term "and/or" is used to include any combination of a plurality of items to be included. For example, "A and/or B" includes all three cases such as "A". "B", and "A and B".

When an element is described as "connected" or "linked" to another element, it should be understood that the element may be directly connected or linked to the other element, or another element may exist in between the two elements.

When a component, device, element, or the like of the present disclosure is described as having a purpose or performing an operation, function, or the like, the component, device, or element should be considered herein as being "configured to" meet that purpose or perform that operation or function.

The terminology used herein is for the purpose of describing particular embodiments only and is not intended to be limiting of the disclosure. Singular expressions include plural expressions unless the context clearly indicates otherwise. In the present application, it should be understood that the terms "include" or "have" and variations thereof indicate that a feature, a number, a step, an operation, a component, a part, or a combination thereof described in the specification is present, but do not exclude the possibility of existence or addition of one or more other features, numbers, steps, operations, components, parts, or combinations thereof.

Unless otherwise defined, all terms used herein, including technical or scientific terms, have the same meaning as that generally understood by those skilled in the art. It should be understood that terms, such as those defined in commonly used dictionaries, should be interpreted as having a meaning that is consistent with their meaning in the context of the relevant art. The terms not be interpreted in an idealized or overly formal sense unless expressly so defined herein.

In addition, the terms "unit" or "control unit" are terms generally used for naming a controller that commands a specific function. Such terms are not intended to refer to a generic function unit. For example, a unit or control unit may include a communication device communicating with another controller or sensor, a computer-readable recording medium storing an operating system or a logic command, input/output information, and the like, in order to control a function, and one or more processors performing determinations, calculations, and the like necessary for controlling the function.

The processor includes a semiconductor integrated circuit and/or electronic devices that perform at least one or more of comparison, determination, calculation, and determination in order to achieve a programmed function. For example, the processor may be a computer, a microprocessor, a CPU, an ASIC, and a circuitry (logic circuits), or a combination thereof.

The computer-readable recording medium (or simply referred to as a memory) includes all types of storage devices in which data that can be read by a computer system is stored. For example, the memory may include at least one type of a flash memory of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The recording medium is electrically connected to the processor, and the processor retrieves and records data from the recording medium. The recording medium and the processor either may be integrated or may be physically separated.

Hereinafter, the embodiments of the present disclosure are described in detail with reference to the accompanying drawings.

Figure 2:
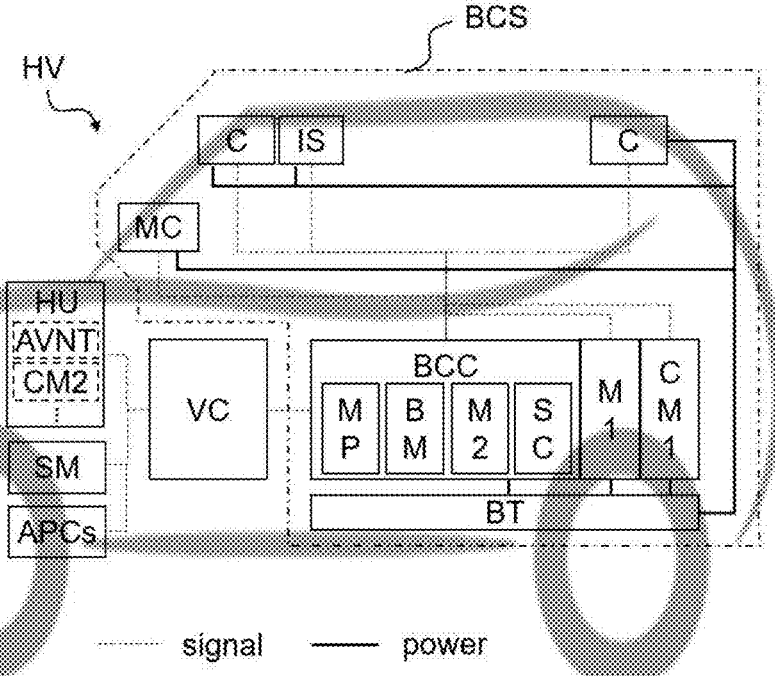
FIG. 2 is a block diagram conceptually showing components of a vehicle, according to an embodiment of the present disclosure.

Referring to FIG. 2, an embedded drive video recording system, or so-called built-in cam system (BCS), according to an embodiment of the present disclosure, is embedded in a host vehicle HV. The embedded drive video recording system includes a camera module C, a computer-readable storage medium M1, a first communication module CM1, a microprocessor MC, an impact sensor IS, a power auxiliary battery BT, and a built-in cam controller BCC.

The drive video recording system may be a built-in type. However, the present disclosure is not limited thereto.

The camera module C includes a front camera and a rear camera in this embodiment, but it the camera module C is not necessarily limited thereto. The front camera is installed to capture an image of the front area of the vehicle HV. The rear camera is installed to capture an image of the rear area of the vehicle I-V.

For example, the front camera may be installed at a position adjacent to a room mirror in the cabin of the vehicle HV, e.g., in the window shield. The rear camera may be installed on the rear window of the cabin of the vehicle HV or the rear bumper, for example.

The front camera and the rear camera may have image quality of either a high definition (HD) camera, a full high definition (FHD) camera, or a Quad HD camera.

It is noted that the front camera and the rear camera do not need to have the same image quality. Also, a camera of an Advanced Drive Assistance System (ADAS) of the host vehicle HV may be used.

In an example, the camera may have an aperture value of F2.0 or less. In an example, the camera may have an aperture value of F1.6 or less. If the aperture value decreases, more light is gathered so that recording may be made brighter. In addition, by applying image tuning technology to minimize the noise and the loss of light, clear recording is possible even in a dark environment.

The computer-readable recording medium (hereinafter, called "memory", in short) M1 includes all types of storage devices in which data that can be read by a computer system is stored. For example, the memory M1 includes at least a memory type of a flash memory, of a hard disk, of a microchip, of a card (e.g., a Secure Digital (SD) card or an eXtream Digital (XD) card), etc., and at least a memory type of a Random Access Memory (RAM), of a Static RAM (SRAM), of a Read-Only Memory (ROM), of a Programmable ROM (PROM), of an Eclectically Erasable PROM (EEPROM), of a Magnetic RAM (MRAM), of a magnetic disk, and of an optical disk.

In an embodiment, the memory M1 is an external type of 64 gigabyte (Gbyte) or a micro SD. For example, a constant recording while driving (hereinafter, referred to as "driving constant recording") may be performed for several hours, and a constant recording while parking (hereinafter, referred to as "parking constant recording") may be performed for several tens of hours. In addition, event recording according to impact detection may be performed up to several tens of times. The event recording may include recording according to impact occurrence while driving (hereinafter, referred to as "driving impact recording") and recording according to impact occurrence while parking (hereinafter, referred to as "parking impact recording"). Whether the current mode is the driving mode or the parking mode may be determined as the driving mode when the vehicle start switch is in an ignition on (ION ON) state and may be determined as the parking mode when the vehicle start switch is not in the ignition on state.

The user can easily check the contents stored in the memory M1 using a desktop computer or the like by extracting the SD card.

The information of the state of the SD card can be checked through the connected car service. Further, the time of replacement according to the memory state can also be checked.

The first communication module CM1 may be configured for wired or wireless communication with the exterior. The first communication module CM1 is not limited to any specific communication protocol.

In an embodiment, the first communication module CM1 includes a communication device capable of directly communicating with nearby devices. The communication device may illustratively be a Wi-Fi module that supports Wi-Fi communication. The Wi-Fi module may include an Access Point (AP) function. Thus, a user may easily and quickly access the built-in cam through, for example, a smartphone.

The microphone MC supports voice recording. When the driving images of the vehicle HV are recorded, not only the images are recorded but also the surrounding sounds (e.g., voices) may be recorded as well.

The impact sensor IS may sense an external impact. The impact sensor IS may include a three-axis gravity sensor installed in the camera module.

The impact sensor IS may be included in the built-in cam system BCS. However, it should be understood that an acceleration sensor installed in the host vehicle IV may additionally, or alternatively, be used as the impact sensor IS.

The signals of the impact sensor IS may be used as a starting point for event recording described in more detail below. The degree of impact serving as a references for the impact sensor IS may be set by the user.

For example, the user can select an impact detection sensitivity that serves as the reference for event recording when setting up the built-in can system BCS through a display screen (e.g., a later described AVNT screen) in the vehicle HV.

In an example, the impact sensitivity may be classified into five levels: a first level (highly unresponsive), a second level (unresponsive), a third level (normal sensitivity), a fourth level (sensitive), and a fifth level (highly sensitive).

The built-in cam system BCS receives power from a battery (e.g., a 12V battery) installed in the vehicle HV.

The system may operate by receiving power of the vehicle HV battery during parking as well as during driving. However, there may be an over-discharge problem of the vehicle HV battery. Thus, the present embodiment includes the power auxiliary battery BT.

In an embodiment, the built-in cam system BCS may receive power firm any one of the battery of the vehicle HV, an alternator in the case of the internal combustion engine vehicle, and a lower DC/DC converter in the case of the electric vehicle, while receiving power from the power auxiliary battery BT during parking. However, the present disclosure is not limited thereto.

The power auxiliary battery BT may be charged and discharged depending on an operating environment of the vehicle HV, The power auxiliary battery BT may supply optimal power for recording and over-the-air (OTA) software updates during parking.

The charging of the power auxiliary battery BT may be performed by a vehicle HV battery (a low voltage battery or a high voltage battery of an electric vehicle), or may be performed by an alternator in the case of an internal combustion engine vehicle HV.

The built-in cam controller BCC is a main controller that controls other components of the built-in cam system BCS and exchanges signals with the controller VC of the host vehicle HV and/or the head unit HU, the sensor module SM, the component controllers' access point controllers (APC)s, etc. For example, local interconnect network (LIN) or controller area network (CAN) communication may be used for such signal exchange.

The head unit HU includes a second communication module (CM2), audio video navigation telematics (AVNT) including a navigation device, and the like. The head unit HU may also include a system control for various integrated information and entertainment functions.

The second communication module CM2 may implement at least one of a mobile communication technology, a wireless Internet technology, or a short-range communication technology.

The mobile communication technology may include at least a Global System for Mobile communication GSM, a Code Division Multi Access CDMA, a Wideband CDMA WCDMA, a High Speed Downlink Packet Access HSDPA, a Long Term Evolution LTE, or a 5G.

The wireless Internet technology may include at least one of wireless local area network (WLAN), Wi-Fi Direct, digital living network alliance (DLNA), wireless broadband (Wibro), world interoperability for microwave access (Wimax), a high speed downlink packet access (HSDPA), or a long term evolution (LTE) technologies.

The short-range communication technology may include at least Bluetooth, Radio Frequency Identification (RFID), Infrared Data Association (IrDA), Ultra-Wideband (UWB), ZigBee, Near Field Communication (NFC), Wi-Fi, or Wi-Fi Direct technologies.

The sensor module SM may include one or more of a speed sensor, an acceleration sensor, a vehicle position sensor (e.g., a GPS receiver), a steering angle sensor, a yaw rate sensor, a pitch sensor, and a roll sensor. The component controllers' APCs may include one or more of a turn signal controller, a turn signal controller, a wiper controller, an ADAS system controller, and an airbag controller.

The built-in cam controller BCC may control other components to perform recording at all times when driving, recording at all times when parking, recording events to be recorded according to the impact signal of the impact sensor, etc.

When recording, driving information of the vehicle HV may be recorded as well.

The vehicle I-V driving information may include time, vehicle speed, gear position, turn signal information, shock detection degree (e.g., one corresponding to the above-described five steps), global positioning system (GPS) position information, etc.

The vehicle driving information may be received from the vehicle controller VC. However, it is noted that the vehicle driving information may also be directly received from a corresponding module or component of the vehicle HV, For example, a vehicle speed may be directly received from a speed sensor of the vehicle HV, As another example, turn signal information (or turn signal information from a turn signal controller) may be directly received from a turn signal controller. As yet another example, GPS location information may be received from a AVNT or a GPS receiver.

As described above, the event recording may be performed when the event occurrence is detected when parking based on the impact detection sensitivity set by the user.

In the event recording, recording may be performed from a set time before the event occurrence time to a set time after the event occurrence time, and the set time may be selected by the user.

The AVNT may connected to the built-in cam controller BCC directly or via the vehicle controller VC. The AVNT screen may thus function as a user interface for receiving various set parameters of the built-in cam system BCS from the user.

The built-in cam controller BCC may transmit recorded content to an external server according to a set period, a user selection, or an event (e.g., a degree of impact detection) of a user setting.

The built-in cam controller BCC includes a memory M2 and a processor MIP to perform its functions.

In an embodiment, the processor MP may include a semiconductor integrated circuit and/or electronic devices that perform at least one or more of comparison, determination, calculation, and determination to achieve a programmed function. For example, the processor MP may be a computer, a microprocessor MC, a CPU, an ASIC, and electronic circuits (circuitry, logic circuits), or a combination thereof.

The memory M2 may be any type of storage device that stores data that can be read by a computer system, and may include, for example, at least a flash memory type of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

Operating software of the BCC is stored in the memory M2. The processor MP reads and executes the corresponding software to perform the function of the BCC.

In addition, the built-in cam controller BCC includes a buffer memory BM for determination, calculation, and the like in the processor MP.

Also, the built-in cam controller BCC includes a super capacitor SC. The super capacitor SC is charged when power is applied to the built-in cam controller BCC.

When power is suddenly cut off due to shock, damage, or the like, power charged in the super capacitor SC is used to complete video storage that is in progress.

In an example, the super capacitor SC may have a charging capacity capable of maintaining the power of the built-in cam controller BCC from several to tens of seconds.

In an embodiment, the vehicle HV comprises a controller. The controller includes a memory storing a computer program for performing a video adjustment process, described in more detail below, and a processor executing the computer program. The controller may comprise the built-in cam controller BCC and the head unit HU controller.

Figure 3:
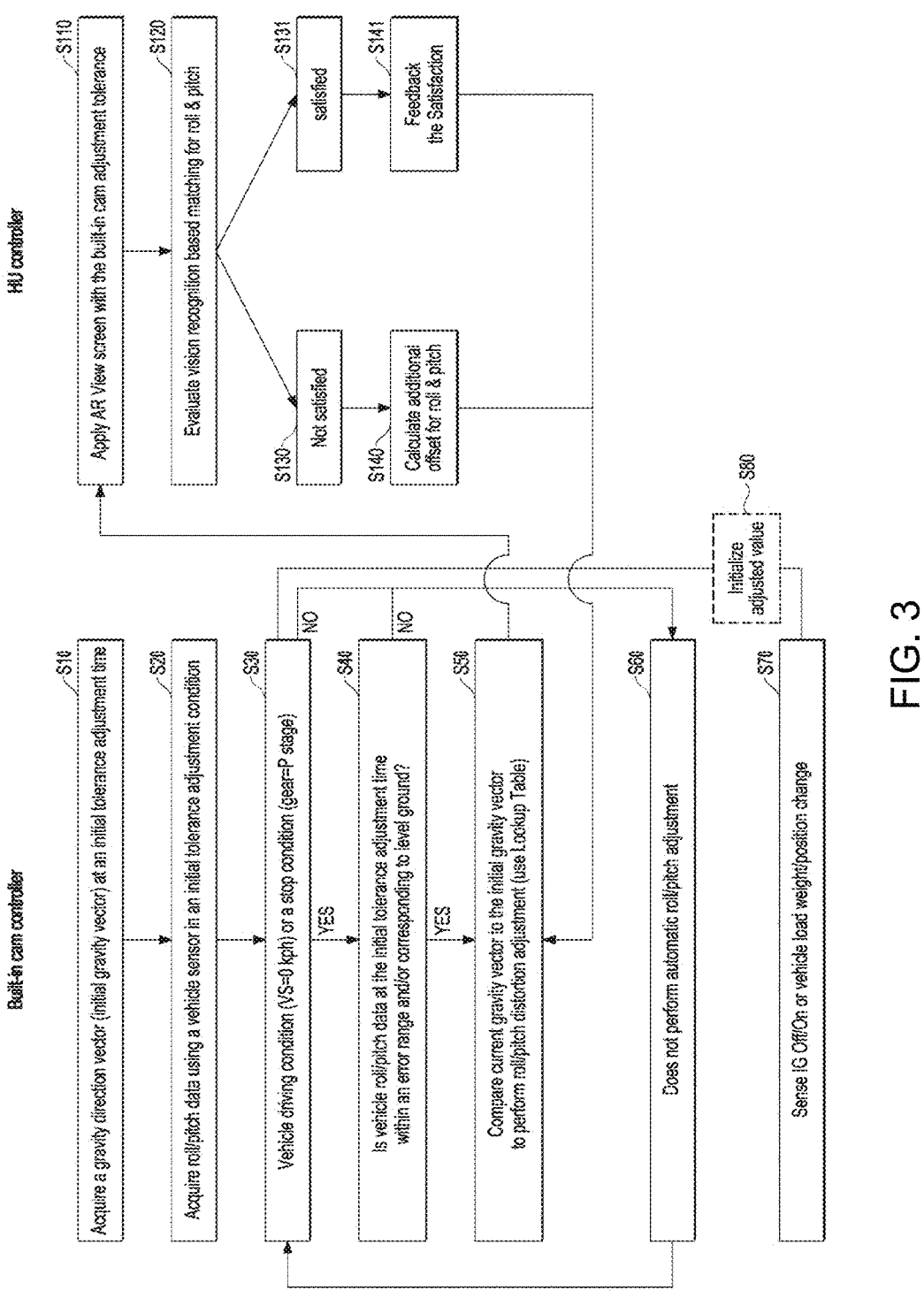
FIG. 3 shows a video adjustment method, according to an embodiment of the present disclosure.

Hereinafter, a video adjustment process is described with reference to FIG. 3.

In an operation S10, a gravity direction vector (sometimes referred to herein as simply a "gravity vector") is acquired. The gravity vector may be acquired when the vehicle HV is manufactured, for example, when tolerance adjustment for the camera module C is performed in the assembly EOL.

In an example, at the time of adjustment of initial tolerance, the gravity vector may be obtained using the above-described impact sensor (IS; sometimes referred to herein as a G sensor). The obtained gravity vector is stored in a memory.

In an operation S20, roll and/or pitch data (sometimes referred to herein as "initial roll and/or pitch data") are acquired using a roll sensor and/or a pitch sensor of the vehicle HV at the time of adjustment of the initial tolerance.

The acquired initial roll and/or pitch data is also stored in the memory.

In the process of use after the vehicle (HV) is shipped, it is determined whether an adjustment condition is satisfied.

For example, in an operation S30, the driving condition or stopping condition of the vehicle HV is checked as a first condition.

In an example, it is checked whether the vehicle HV speed is zero or the transmission gear is in a parking position.

When the first condition is satisfied (YES in the operation S30), it is checked whether a second condition is satisfied in an operation S40.

To determine whether the second condition is satisfied, it is checked whether data acquired by the roll and/or pitch sensors of the vehicle HV is within a set error range of the initial roll and/or pitch data. Additionally, or alternatively, it is determined whether the current road that the vehicle HV is on is level.

In order to determine whether the current road is level, GPS position information and navigation map information of the vehicle HV may be used.

When the second condition is satisfied, this signifies that the condition is almost the same as the condition during the initial tolerance adjustment.

If the second condition is satisfied (YES in the operation S40), an adjustment value is determined in an operation S50 based on the current gravity vector and the initial gravity vector.

Figure 4:
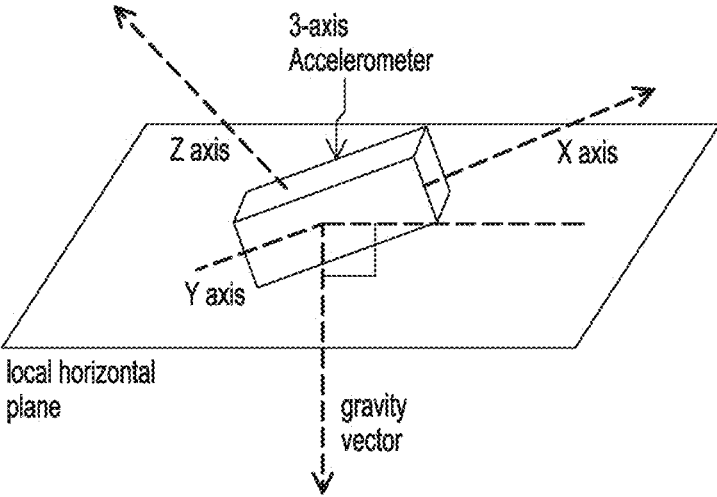
FIG. 4 shows a G sensor mounted on the vehicle of FIG. 2, according to an embodiment of the present disclosure.

Referring briefly to FIG. 4, the position of the coordinate system of the G sensor IS may vary according to the position of the vehicle body in which the G sensor IS is installed. Further, because the gravity vector always faces the ground, the gravity vector based on the coordinate system of the G sensor IS varies depending on the position.

In order to determine the adjustment value in the operation S50, the adjustment value based on the initial gravity vector may be experimentally acquired with respect to the gravity vector acquired for each of the various vehicle HV loading states. The acquired adjustment values may be stored in the memory as a lookup table.

Accordingly, when the gravity vector is acquired in the current loading state, the adjustment value may be determined from the lookup table.

The adjustment value may include a pitch adjustment value for pitch angle adjustment and a roll adjustment value for roll angle adjustment.

On the other hand, when one or both of the first condition and the second condition are not satisfied, the process proceeds to an operation S60. In this case, the roll/pitch adjustment is not performed.

When the adjustment value is determined in the operation S50, video adjustment is performed in an operation S110 by applying the adjustment value.

Accordingly, a video adjusted from the head unit I-U screen to the AR navigation video is displayed.

Simultaneously, in an operation S120, matching between the adjusted video and the AR image is determined.

For example, the lane line LLd of the host lane may be extracted from the corrected video, and the matching property may be determined using an overlay image of the host lane in the AR image.

If the result of determining the matching is satisfactory, as indicated in a block S131, the result is provided as feedback to the operation S50.

If the result of the matching is not satisfactory, as indicated in a block S130, an offset value is determined in an operation S140 based on information recognized from the AR image and the adjusted video. The offset value represents a degree of distortion between the adjustment video and the corresponding AR image. The offset value may provide an additional adjustment value.

The offset value includes a roll offset value and a pitch offset value. Processes for determining the roll offset value and the pitch offset value, according to embodiments, are described, respectively, with reference to FIG. 5 and FIGS. 6A-B.

Figure 5:
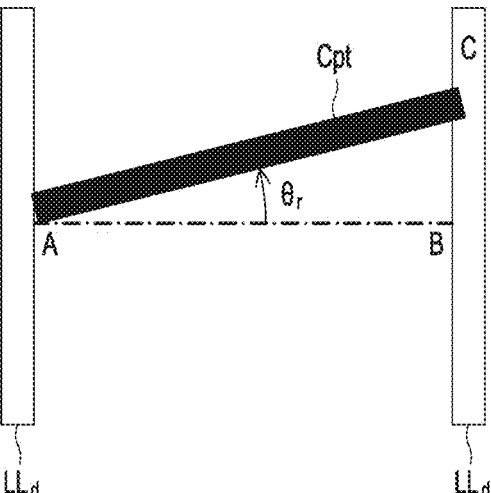
FIG. 5 illustrates a process of determining a roll offset value based on an adjusted video and an AR image, according to an embodiment of the present disclosure.

As shown in FIG. 5, a roll offset value may be determined based on an angle θr between a lane line LLd recognized from the adjusted video and an overlay AR image Cpt.

Referring to FIG. 5, a first intersection point A and a second intersection point C at which the lane line LLd intersects with the overlay AR image Cpt may be determined. Also, a vertical point B perpendicularly intersecting the opposite lane line LLd from the first intersection point A may be determined Additionally, an offset roll angle (roll offset value) may be determined based on a distance between the first intersection point A and the vertical point B and a distance between the vertical point B and the second intersection point C.

A process of determining a pitch offset value, according to an embodiment, is described with reference to FIGS. 6A and 6B.

Figure 6A:
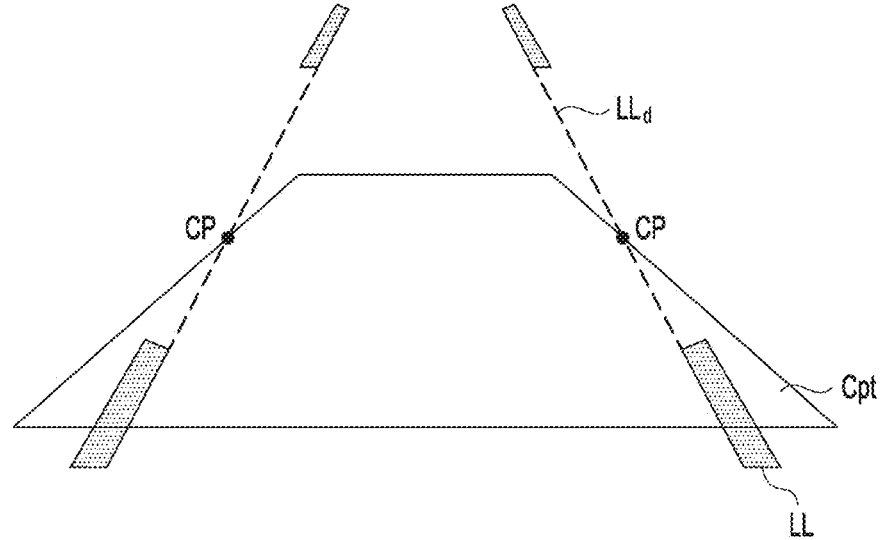
FIGS. 6A and 6B illustrate a process of determining a pitch offset value based on an adjusted video and an AR image, according to an embodiment of the present disclosure.
Figure 6B:
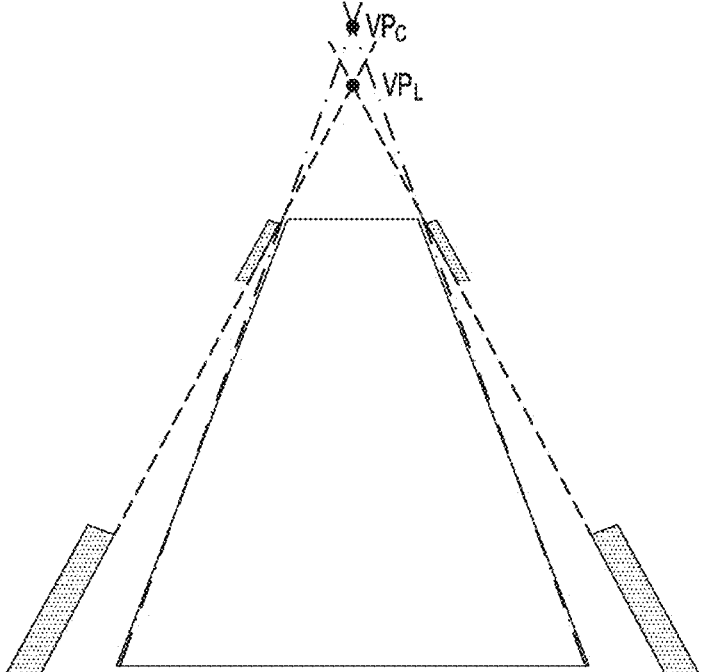

FIGS. 6A and 6B illustrate a case where the width of the overlay AR image Cpt is greater than a distance between the lane lines LLd recognized in the adjustment video.

In this case, as shown in FIG. 6A, an intersection point Cp at which the lane line LLd intersects the overlay AR image Cpt is extracted, and a pitch offset value (hereinafter, referred to as a first pitch offset value) is determined using coordinates of the intersection point Cp. For example, the first pitch offset value may be experimentally acquired according to the coordinates of the intersection point Cp and stored in the memory as a lookup table. Alternatively, because the coordinates of the intersection point Cp are linearly changed as the pitch angle is changed, the first pitch offset value may be determined based on the relationship.

FIG. 6B illustrates a case where the width of the overlay AR image Cpt is smaller than the distance between the lane lines LLd recognized in the adjustment video. FIG. 6B shows a case in which the pitch angle direction is opposite to that of FIG. 6A.

In the case of FIG. 6B, a pitch offset value (hereinafter, referred to as a second pitch offset value) is determined using a distance between a vanishing point $VP_L$ of the left and the right lane lines LLd and a vanishing point $VP_C$ of the overlay AR image Cpt.

The second pitch offset value according to the distance between the two vanishing points $VP_L$ and $VP_C$ may be experimentally acquired and stored in a lookup table. Alternatively, the second pitch offset value may be determined based on a relational expression between the distance between the two vanishing points $VP_L$ and $VP_C$ and the second pitch offset value.

Referring back to FIG. 5, the acquired offset value is provided as feedback to the operation S50.

In the operation S50, a final adjustment value is determined by additionally reflecting the feedback offset value to the adjustment value determined based on the gravity vector.

For example, in the operation S50, the adjustment value is determined based on the gravity vector as described above, and when there is an offset value as feedback, the offset value is also reflected to determine the final adjustment value.

In an operation S80, when the start switch of the vehicle HV is switched "IG Off" and is again switched "IG On"

(referred to as "IG Off/On", in short) or the load weight or position of the vehicle HIV is changed, the adjustment value is initialized.

In an embodiment, because the video and the AR image may be distorted again when the passenger gets off the vehicle or the baggage loading state is changed in a state where the adjustment condition is not satisfied (e.g., stop due to slope), when the load change condition is sensed, the adjustment value is initialized (e.g. returned to the initial tolerance adjustment value) to minimize distortion of the AR view.

In an example, detection of the change in the loading position and/or the weight may be performed using the vehicle HV weight sensor and/or suspension damping information.

In addition, even in the case of IG Off/On, the adjustment value may be initialized to the EOL tolerance adjustment state to prevent an error that may occur due to the accumulation of offset values.

In an embodiment, operations S10-S80 are performed by the built-in cam controller BCC, and operations S110-S141 are performed by the head unit controller HU However, the present disclosure is not limited thereto.

What is claimed is:

1. A method for adjusting a video image in a vehicle equipped with a driving video recording device, the method comprising:

obtaining, by a camera module of the driving video recording device, video data corresponding to a video depicting surroundings of the vehicle;

obtaining, by a processor of the driving video recording device, a gravity vector acquired using a G sensor of the driving video recording device;

determining, by the processor, an adjustment value according to the gravity vector acquired using the G sensor, the adjustment value including one or both of a pitch adjustment value or a roll adjustment value;

adjusting, by the processor, the video data using the adjustment value to generate adjusted video data;

displaying, by a head unit of the vehicle, the adjusted video data together with navigation information on a screen; and determining, by the processor, whether the vehicle satisfies an adjustment condition including one or both of i) a first condition on whether the vehicle is in a stopped state or ii) a second condition on whether one or both of a) data acquired by one or both of a roll sensor of the vehicle or a pitch sensor of the vehicle is within a set error range from preset data or b) a road that the vehicle is currently on is level.

2. The method of claim 1, wherein the adjustment value is determined based on a preset gravity vector and the gravity vector acquired using the G sensor.

3. The method of claim 2, wherein the preset gravity vector is determined based on a gravity vector acquired by the G sensor at a time of an initial tolerance adjustment for the camera module.

4. The method of claim 1, wherein the preset data includes one or both of i) initial roll data acquired by the roll sensor at an initial tolerance adjustment for the camera module or ii) initial pitch data acquired by the pitch sensor at the initial tolerance adjustment for the camera module.

5. The method of claim 1, further comprising determining, by the processor, a matching property between the adjusted video data and an augmented reality (AR) image of the navigation information.

6. The method of claim 5, further comprising determining, by the processor, an offset value based on the AR image and the adjusted video data according to the matching property.

7. The method of claim 6, wherein adjusting the video data includes applying the offset value.

8. The method of claim 6, wherein determining the offset value includes one or more of i) determining a roll offset value based on an angle between a lane line recognized from the adjusted video data and the AR image of a host lane overlay shaped to cover a driving lane of the vehicle, ii) determining a first pitch offset value based on an intersection point between the lane line and the AR image of the host lane overlay, or iii) determining a second pitch offset value based on a distance between a vanishing point of lane lines recognized from the adjusted video data and a vanishing point of the AR image of the host lane overlay.

9. The method of claim 1, further comprising initializing, by the processor, the adjustment value when a start switch of the vehicle is switched to an ignition off (IG Off) state and then switched to an ignition on (IG On) state or when a load weight or position of the vehicle is changed.

10. A vehicle, comprising:

a driving video recording device including a G sensor, a camera module configured to acquire video data corresponding to a video of surroundings of the vehicle, a first memory configured to store the video data, a second memory configured to store a computer program for controlling storage of the video data, and a controller including a processor configured to execute the computer program; and a head unit configured to receive the video data from the camera module and display the video data together with navigation information on a screen;

wherein the processor is configured to execute the computer program to determine an adjustment value according to a gravity vector acquired using the G sensor and adjust the video data using the adjustment value to generate adjusted video data, wherein the adjustment value includes one or both of a pitch adjustment value or a roll adjustment value, and wherein the processor is further configured to determine whether the vehicle satisfies an adjustment condition including one or both of i) a first condition on whether the vehicle is in a stopped state or ii) a second condition on whether one or both of a) data acquired by one or both of a roll sensor of the vehicle or a pitch sensor of the vehicle is within a set error range from preset data or b) a road that the vehicle is currently on is level.

11. The vehicle of claim 10, wherein the processor is configured to determine the adjustment value based on a preset gravity vector and the gravity vector acquired using the G sensor.

12. The vehicle according to claim 11, wherein the preset gravity vector is determined based on a gravity vector acquired by the G sensor at a time of an initial tolerance adjustment for the camera module.

13. The vehicle of claim 10, wherein the preset data includes initial one or both of i) initial roll data acquired by the roll sensor at an initial tolerance adjustment time for the camera module or ii) initial pitch data quired by the pitch sensor at the initial tolerance adjustment time for the camera module.

14. The vehicle of claim 10, wherein the processor is further configured to determine a matching property between the adjusted video data and an augmented reality (AR) image of the navigation information.

15. The vehicle according to claim 14, wherein the processor is further configured to determine an offset value based on information recognized from the AR image and the adjusted video data according to a result of the matching property.

16. The vehicle of claim 15, wherein the processor is configured to adjust the video data by further applying the offset value.

17. The vehicle of claim 15, wherein the processor is configured to determine the offset value at least by performing one or more of i) determining a roll offset value based on an angle between at least one lane line recognized from the adjusted video data and the AR image of a host lane overlay shaped to cover a driving lane of the vehicle, ii) determining a first pitch offset value based on an intersection of the at least one of lane lines and the AR image of the host lane overlay, or iii) determining a second pitch offset value based on a distance between a vanishing point of the lane lines and a vanishing point of the AR image of the host lane overlay.

18. The vehicle of claim 10, wherein the processor is further configured to initialize the adjustment value when a starting switch of the vehicle is switched to an ignition off (IG Off) state and then switched to an ignition on (IG On) or when a load weight or position of the vehicle is changed.

* * * * *